US007640438B2

(12) United States Patent
Varadarajan et al.

(10) Patent No.: US 7,640,438 B2
(45) Date of Patent: Dec. 29, 2009

(54) SYSTEM AND METHOD FOR PROTECTED CONTENT RENDERING

(75) Inventors: Sridhar Varadarajan, Bangalore (IN); Korrapati Kalyana Rao, Bangalore (IN)

(73) Assignee: Satyam Computer Services Ltd., Bangalore (IN)

( * ) Notice: Subject to any disclaimer, the term of this patent is extended or adjusted under 35 U.S.C. 154(b) by 727 days.

(21) Appl. No.: 11/058,622

(22) Filed: Feb. 15, 2005

(65) Prior Publication Data
US 2006/0184805 A1    Aug. 17, 2006

(51) Int. Cl.
G06F 11/30 (2006.01)
G06F 12/14 (2006.01)

(52) U.S. Cl. .................................... 713/193; 380/210
(58) Field of Classification Search .............. 380/210; 705/59; 713/168, 193; 719/331; 726/26, 726/27

See application file for complete search history.

(56) References Cited

U.S. PATENT DOCUMENTS

| | | | |
|---|---|---|---|
| 6,141,698 A * | 10/2000 | Krishnan et al. | 719/331 |
| 6,330,675 B1 * | 12/2001 | Wiser et al. | 713/189 |
| 6,640,304 B2 * | 10/2003 | Ginter et al. | 713/193 |
| 6,772,340 B1 * | 8/2004 | Peinado et al. | 713/168 |
| 6,775,655 B1 * | 8/2004 | Peinado et al. | 705/59 |
| 6,775,779 B1 * | 8/2004 | England et al. | 726/26 |
| 7,120,800 B2 * | 10/2006 | Ginter et al. | 713/193 |
| 7,152,166 B2 * | 12/2006 | Strom et al. | 713/193 |
| 7,313,825 B2 * | 12/2007 | Redlich et al. | 726/27 |
| 7,322,047 B2 * | 1/2008 | Redlich et al. | 726/27 |
| 2004/0105543 A1 * | 6/2004 | Koto et al. | 380/210 |
| 2006/0179327 A1 * | 8/2006 | Musa et al. | 713/193 |
| 2006/0184805 A1 * | 8/2006 | Varadarajan et al. | 713/193 |

OTHER PUBLICATIONS

Edward W. Felten; A skeptical view of DRM and fair use; Year of Publication: 2003; ACM; vol. 46, Issue 4; pp. 56-59.*

* cited by examiner

*Primary Examiner*—Michael J Simitoski
*Assistant Examiner*—Monjour Rahim
(74) *Attorney, Agent, or Firm*—The Webb Law Firm (57) ABSTRACT

The use of a variety of devices to render multimedia content is on the increase. It is important ensure that the content owners/providers get their share of return on investment in order to achieve the unlimited global distribution of content. However, illegal use of the delivered content could affect such a return on investment. One of the important requirements is to protect a content and allow for rendering of the protected content in an efficient manner on target devices. A system for protected content rendering involves ensuring that the unprotected content is not available for misuse.

2 Claims, 8 Drawing Sheets

SYSTEM FUNCTIONALITY OF PCR SYSTEM

FIG. 1: SYSTEM FUNCTIONALITY OF PCR SYSTEM

FIG. 2: PAGE SELECTION PROCEDURE

FIG. 3: INCREMENTAL DECRYPTION

FIG. 4: SCRAMBLER

FIG. 5: RANDOM PATTERN GENERATOR

FIG. 6: RENDERING ENGINE

FIG. 7: DISPLAY REALIZATION

```
JID
{
  Obtain information related to Frame Buffer Base and Frame Buffer Offset addresses;
  Obtain key for byte-level decryption;
  Obtain encrypted byte-level content;
  Decrypt byte-level content;
  Copy plain content to display registers just in time for display circuits to access them;
  Use multiple display registers in a pipeline fashion;
  Select the next set of display registers in a random fashion;
}
```

FIG. 7A: PROTOTYPE OF JID CODE

FIG. 8: SYSTEM ARCHITECTURE OF PCR SYSTEM

SYSTEM AND METHOD FOR PROTECTED CONTENT RENDERING

FIELD OF THE INVENTION

The present invention relates to the protection of content in general, and more particularly, protection of content during rendering. Still more particularly, the present invention relates to a system and method for protected content rendering by ensuring that the unprotected content is not accessible for misuse.

BACKGROUND OF THE INVENTION

Multimedia content delivery via Internet and other forms of network is creating more opportunities for content owners and content providers to reach a wider market. Specifically, the content providers publish their content on a network and users download the content based on the terms and conditions of the providers and use the same. Such network based electronic transactions help users get the kind of content they want when they want. Typical terms and conditions include electronic payment and granting of rights to use the content in a particular manner. Any violation of these granted rights by the users would result in (a) breach of contract and (b) potential loss of revenue for providers. It is one of the major requirements of the content industry to protect content and to ensure that there is a less and less of rights violations. Additional complexity arises due to the delivery of content to a multitude of devices (desktops, laptops, and handhelds), connected through a multitude of networks (wireline and wireless networks), and into a multitude of environments (homes, automobiles, and public places). While this broadens the reachability, at the same time, it increases the scope for granted rights violations. It is difficult to enforce rights if it can be violated easily. Availability of fairly easily accessible plain content is one of the reasons for violations and it is required to protect the content as much as possible while it is stored on a user device or while it being rendered.

Typically, content is protected by encrypting it at source and providing the key to decrypt the content whenever there is a need to use this content. While this process is quite adequate as a means for content protection, it is not without vulnerabilities. It depends on whether the decrypted content is available for manipulation. Specifically, the questions of interest are, is it possible to store the decrypted content, is it possible to access the decrypted content, or is it possible to send the decrypted content to another device? An affirmative answer to any of the above questions could potentially lead to rights violations. Any system that addresses any of these questions would help enforce content rights in an effective manner.

DESCRIPTION OF RELATED ART

U.S. Pat. No. 6,772,340 to Peinado; Marcus (Bellevue, Wash.); Liu; Donna (Bellevue, Wash.); Ganesan; Krishnamurthy (Redmond, Wash.) for "Digital rights management system operating on computing device and having black box tied to computing device" (issued on Aug. 3, 2004 and assigned to Microsoft Corporation (Redmond, Wash.)) describes a digital rights management system that operates on a computing device to process an encrypted content and to render the same on the computing device. A black box is tied to the computing device and the decryption key to decrypt the encrypted content is encrypted according to the black box. This invention provides for a mechanism for generating device-specific license and encryption key for securing a content.

U.S. Pat. No. 6,775,655 to Peinado; Marcus (Bellevue, Wash.); Manferdelli; John L. (Redmond, Wash.); Bell; Jeffrey R. C. (Seattle, Wash.) for "Rendering digital content in an encrypted rights-protected form" (issued on Aug. 10, 2004 and assigned to Microsoft Corporation (Redmond, Wash.)) describes a rendering application that determines that a digital content is in an encrypted rights-protected form and obtains a decryption key from a digital rights management system based on a license and provides the decrypted content using the obtained decryption key to the rendering application.

U.S. Pat. No. 6,775,779 to England; Paul (Bellevue, Wash.); Lampson; Butler W. (Cambridge, Mass.) for "Hierarchical trusted code for content protection in computers" (issued on Aug. 10, 2004 and assigned to Microsoft Corporation (Redmond, Wash.)) describes an architecture for protecting a content in a non-secure computer environment. The code modules that execute in a secure memory are arranged in a hierarchy of trust. A secure loader loads a security manager that manages a number of modules for manipulating the content and a memory manager assigns permissions to various pages of secure memory.

The known systems do not address the issue of reducing the amount and time of availability of plain content in order to reduce the possibility of misuse.

Contemporary rights management has been troubled with the rapid increase of digital media. Physical rights management has been heavily dependant on the physicality of actual materials of media, an inherit deterrent to the unauthorized use of content. Lacking this quality, coupled with the internet and broadband, digital media is increasingly being copied and shared abundantly. Seeking to address the numerous violations of copyright law, the early Digital rights management (DRM) systems consisted of simple digital padlocks. The content is sent encrypted, locked down, and then passwords are only sent to authorized users. The newer DRM systems aspire to track the distribution, status, description, transmission, of all rights employed and used in the digital world. Designing a DRM system generates a number of difficulties, higher and tighter control could contribute to obstructions of digital interactions, a thoroughly detailed DRM may prove to be intrusive in information gathering, and a strict DRM system may not be robust to accommodate all the uses of rights.

Considering these factors we propose a network-centric DRM solution which is divided into two components; DRM monitoring and DRM enforcement. The first component, DRM monitoring, observes messages generated from content transactions through a secure DRM channel, allowing content identification, confirmation, and verification. The second component, DRM enforcement, is implemented by embedding digital rights enforcement codes with a key in the encryption of the content. These two components make it possible to track contents delivery and usage condition, also enforcing DRM, preventing piracy.

Our DRM enforcement approach will divide rights into single-view rights and multi-view rights. Single view rights allows a single viewing or usage, where multi-view provides the actual content to the customer for multiple viewings. The Content Service Providers (CSP), Network Service Provider (NSP), and device functionality supplement the enforcement of DRM. First, the CSP encrypt their content. After the encryption, the rights enforcement code and a key are embedded into the encrypted contents at the NSP. The decryption key is obtained by executing the rights enforcement code.

The main aspect of this approach is to exploit the support from the OS to achieve effective monitoring of the content usage. In order to avoid accessibility to plain content, Justin-time Decryption (JID) is used. With JID, decrypted information is available as briefly as possible and only in very small chunks at a time. In this approach, byte-by-byte decryption is performed such that plain contents in display registers are available for too short a time period for manipulation to occur. The approach for DRM enforcement makes use of the support extended by hardware and OS of the mobile device. The FPGA-based Just-in-time Decryption enables real-time control on digital rights while DRM enabled OS monitors digital contents whenever the device power is on. The proposed approach provides a solution for enforcing digital rights and at the same time monitor the content usage with respect to the granted rights. The solution is efficient and effective, designed to be reliable and robust in enforcing rights management for the digital age.

The paper, "Network Centric Mobile Digital Rights Management," submitted to and presented in the in Workshop on Digital Rights Management Impact on Consumer Communications, Las Vegas, Jan. 6, 2005.

The present invention provides with a protected content rendering system to help reduce the quantum and the time of availability of plain content. Further, the present invention proposes an approach for preventing an access to even this reduced quantity of plain content.

SUMMARY OF THE INVENTION

The primary objective of the invention is to achieve protected content rendering. This is achieved by reducing the quantum and time of availability of plain content.

One aspect of the present invention is the notion of incremental decryption wherein a page of protected content is repeatedly decrypted.

Another aspect of the present invention is to divide a page of protected content into a number of blocks and to decrypt the blocks in synchronous with a rendering engine.

Yet another aspect of the present invention is to select a buffer randomly to fill the buffer with plain content.

Another aspect of the present invention is to use a randomly generated byte pattern to randomly distribute plain content within a buffer.

Yet another aspect of the present invention is a rendering engine that obtains plain content from a randomly ordered byte pattern of a randomly selected buffer for rendering purposes.

Another aspect of the present invention is to generate control signals as successive byte sequences get rendered.

DETAILED DESCRIPTION OF THE PREFERRED EMBODIMENTS

Figure 1:
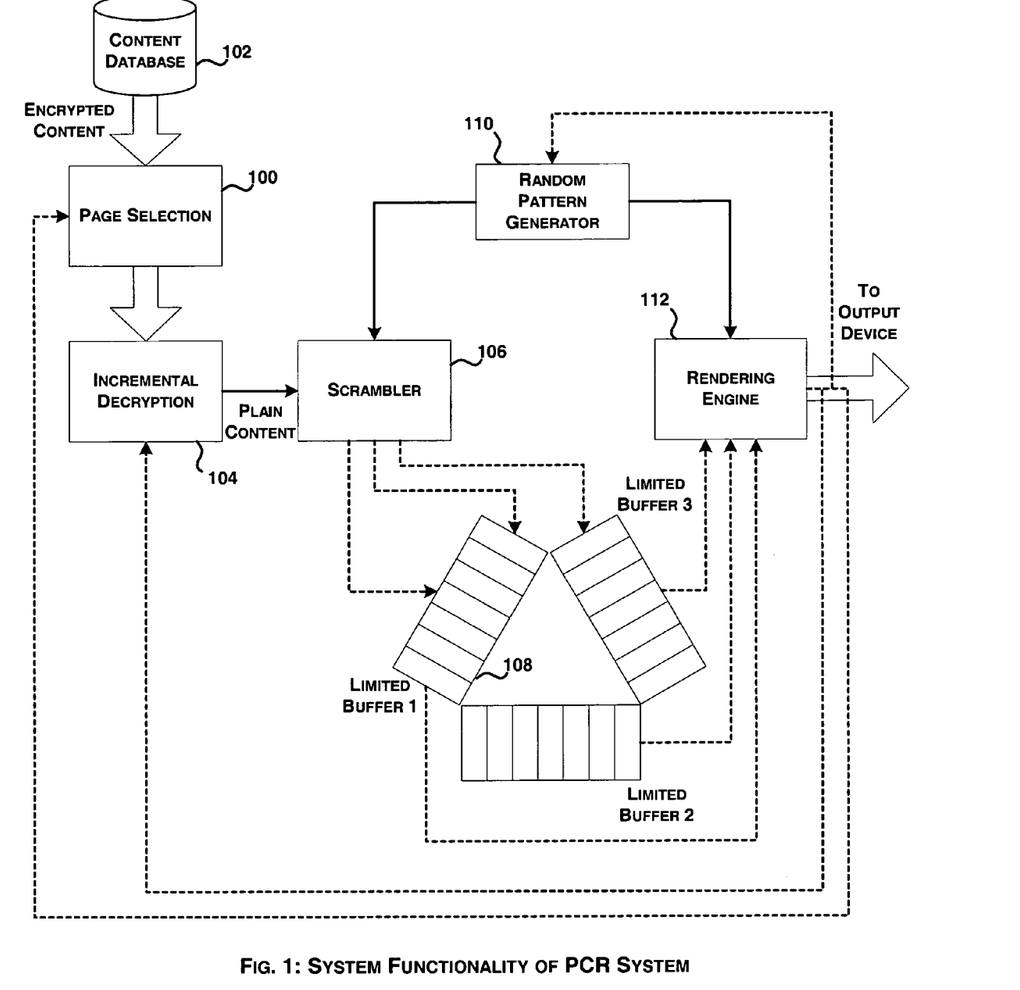
FIG. 1 depicts the functionality of Protected Content Rendering (PCR) system.

FIG. 1 depicts a high level functionality of Protected Content Rendering (PCR) system. Page Selection (PS) (100) subsystem accesses content database (102) to select content that needs to be rendered and processes this content page by page. From this point of view, the content is divided into a number of pages and a page, for example, is that amount of content that when displayed occupies entirely of a screen. Page Selection subsystem selects the pages of a content in a sequential manner and provides them one after another to Incremental Decryption (ID) (104) subsystem. ID breaks a page into a number of blocks in order to carry out decryption block at a time and this is performed repeatedly until it is time to process another page. Such an incremental decryption ensures that only a small amount of plain content is available for a very short period of time, thereby reducing the possibility of misuse. In order to prevent access to a plain block, Scrambler (SS) (106) subsystem distributes plain content in a random manner to a randomly selected buffer. Note that while the number of buffers could by any number, in order to achieve the set objective of making as little of content as possible in plain form, the figure depicts the use of three buffers (108), each with limited capacity (block size). Random Pattern Generator (RPG) (110) subsystem generates two distinct random quantities: One is to select a buffer and the other is to distribute plain content in a random manner onto the selected buffer. RPG generates a new set of random numbers each time it receives a control signal from Rendering Engine (RE) (112) subsystem. The main task of RE is to render plain content on a targeted output device such as display device or speaker. PCR system ensures that plain content is available for rendering and further ensures that the protected content rendering process doesn't by itself cause any delay in rendering. Based on this aspect, RE generates control signals in advance and sends the same to ID, RPG, and PS subsystems. While ID subsystem uses this signal trigger to decrypting and generation of plain content of next block, RPG uses the signal to generate next set of random numbers. Finally, PS subsystem uses the signal to initiate the processing of next page.

The main objectives of PCR system are (a) to perform incremental decryption, specifically, small quantities at a time; (b) to prevent access to plain content as much as possible; and (c) to carry out incremental decryption in a manner synchronous with rendering process. The first objective is achieved with the help of ID subsystem, the second with help of RPG and SS subsystems, while the third is achieved with the help of RE subsystem.

Figure 2:
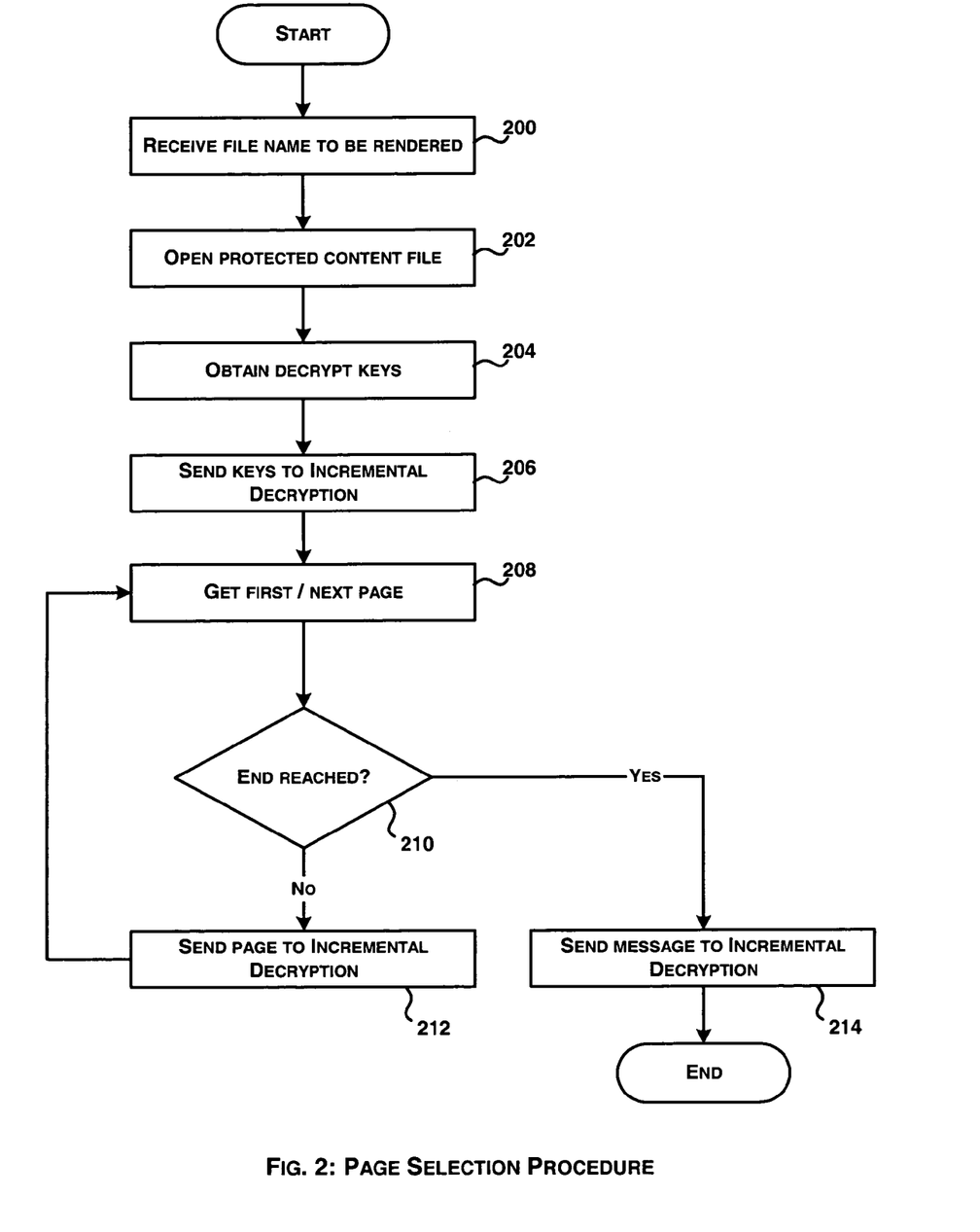
FIG. 2 depicts the procedure for page selection.

FIG. 2 describes the procedure related to PS subsystem. The input request regarding the protected content file to be rendered is received (200). The input file is retrieved from the database (202) and the decrypt keys for converting the protected content to plain content is also received (204). Typical use of the decrypt keys is to decrypt the content file and provide the same for rendering. The present invention suggests the page by page processing of input file and block by block decrypting of content. The obtained decrypt keys are sent to ID subsystem (206). The content file is processed sequentially and the first/next page of the protected content is obtained (208). If a page is available for processing (210), the same is sent to ID subsystem (212). On the other hand, if there are no more pages (210), a suitable message is sent to ID subsystem indicating the end of the content file (214).

Figure 3:
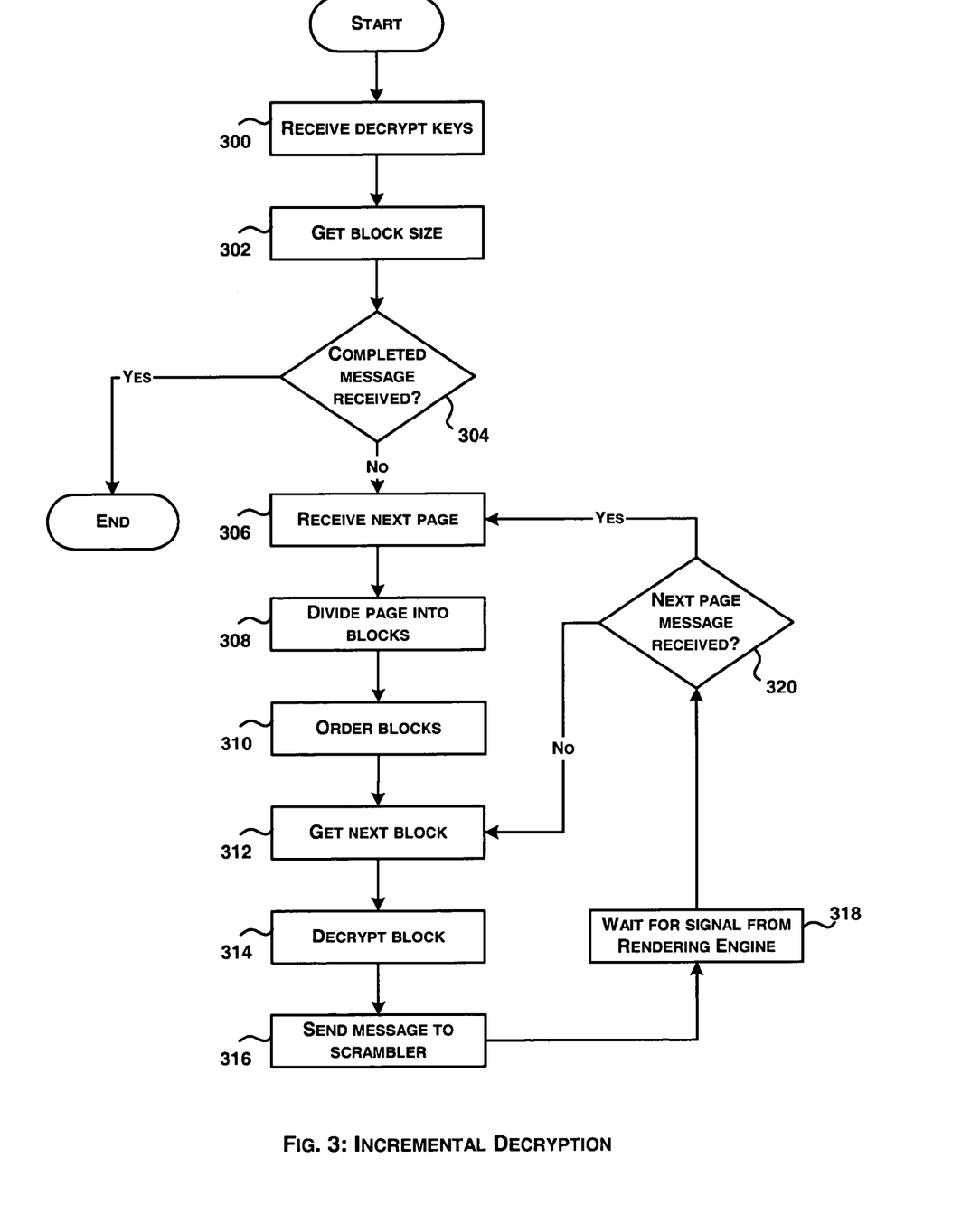
FIG. 3 depicts the procedure for incremental decryption.

FIG. 3 describes the procedure related to ID subsystem. For the content file to be processed, the associated decrypt keys are obtained (300). ID subsystem processes the page contents in an incremental manner by dividing the page into multiple blocks and in order to achieve incremental processing, the configured block size is obtained (302). If there are more pages remain for processing (304), the next page is received from PS subsystem (306). The received page is divided into a number of blocks based on the obtained block size factor (308), and the blocks are appropriately ordered (310). The next block to be processed is obtained (312) and is decrypted using the obtained decrypt keys (314). The availability of plain block for rendering is informed to SS subsystem (316). The subsystem waits for a signal from RE subsystem in order to process the next block (318). On receiving such a signal, if a new page message has not been received (320), the next block is obtained (312) and processed. Otherwise (320), the next page is received (306) and processed.

Figure 4:
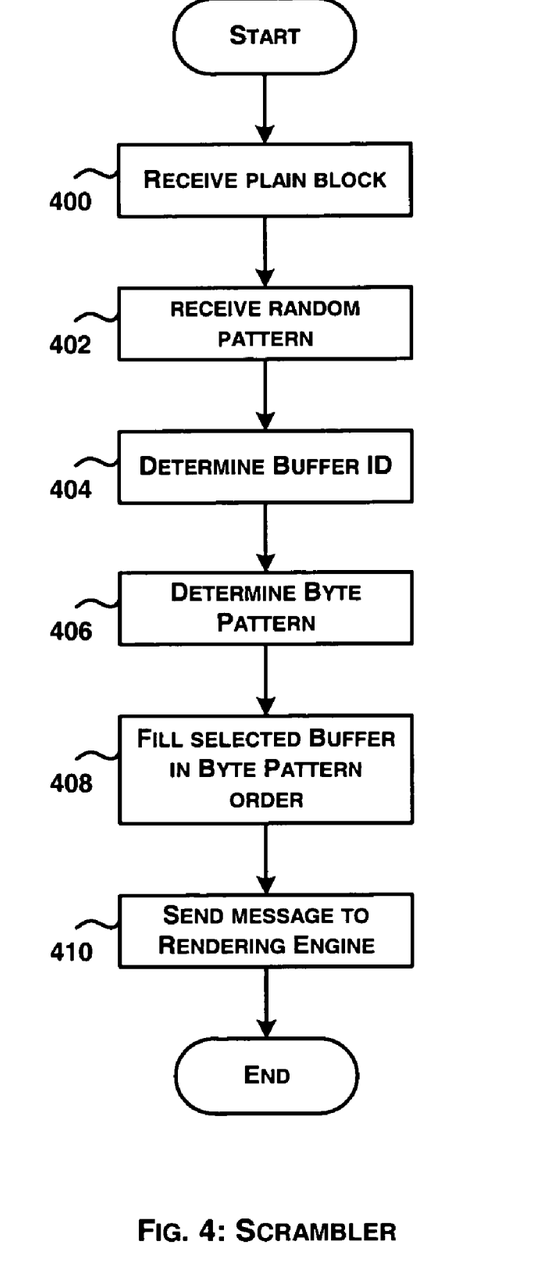
FIG. 4 depicts the procedure for scrambling operation.

FIG. 4 describes the procedure related to SS subsystem. The subsystem receives a plain block from ID subsystem and processes the same based on the random pattern received from RPG subsystem. A plain block is received (400) and a random pattern is received (402). The received random pattern consists of two distinct random quantities: first is a random number to help select a suitable buffer with limited size; and the second is a random pattern to help fill the selected buffer in a random order. Based on the received random pattern, Buffer ID is obtained (404). Further, Byte Pattern is also extracted from the received random pattern (406). The selected buffer is appropriately filled in the random order based on the plain content received from ID subsystem using Byte Pattern (408). Finally, a message is sent to RE subsystem indicating the availability of plain content for rendering (410).

Figure 5:
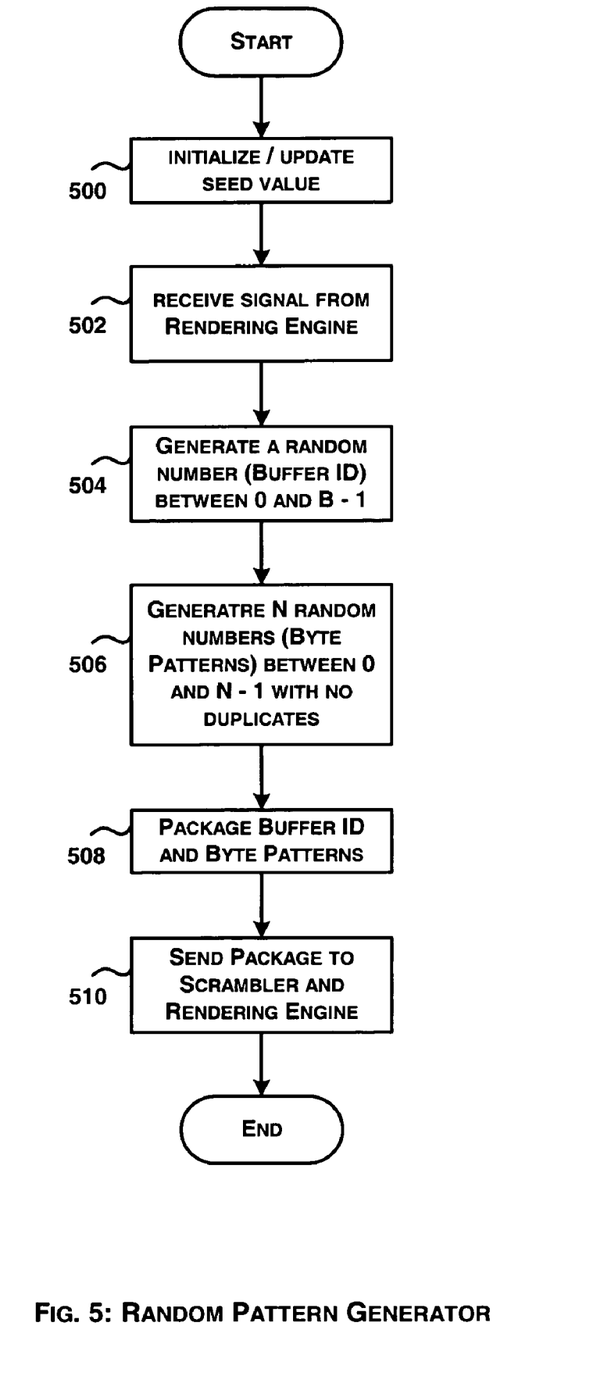
FIG. 5 describes the procedure related to random pattern generation.

FIG. 5 describes the procedure related to RPG subsystem. The random number generation is based on a seed value and the seed value is suitably initialized and subsequently updated whenever there is a need to generate a new set of random numbers (500). On receiving a signal from RE subsystem (502), a random number, Buffer ID, between 0 and B−1 is generated where B is the configured number of buffers (504). Further, N random numbers, each between 0 and N−1 and without any duplicates, are generated where N is the configured block size (506). The generated Buffer ID and N random numbers are packaged (508) and sent to SS and RE subsystems (510).

Figure 6:
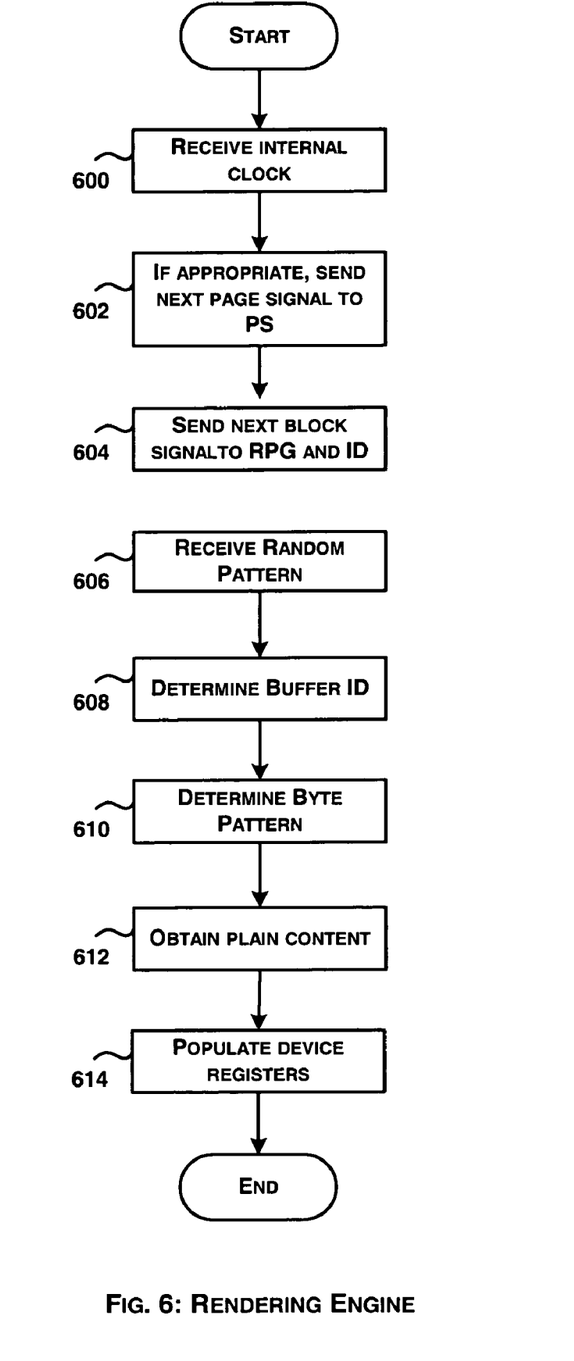
FIG. 6 describes the functionality of rendering engine.

FIG. 6 describes the procedure related to RE subsystem. RE subsystem works based on an internal clock and the same clock is used to achieve block by block rendering. It is required that PCR system doesn't introduce any delay during rendering and this is achieved by suitably coordinating the activities of the various subsystems of PCR system. Particularly, RE, RPG, and ID have to work in harmony to successfully realize incremental block by block decryption, scrambling, and rendering. Based on the received internal clock information (600), it is determined whether a new page needs to be processed. If so, an appropriate signal is sent to PS subsystem (602). A suitable signal is sent to RPG and ID subsystems to obtain the next block data (604). A random pattern containing Buffer ID and Byte Pattern is received from RPG subsystem (606). The received random data is analyzed to extract Buffer ID (608) and Byte Pattern (610). The Byte Pattern is used to extract plain content from the buffer, Buffer ID (612), and the extracted content is used to populate device registers that is used by rendering circuitry (614).

Figure 7:
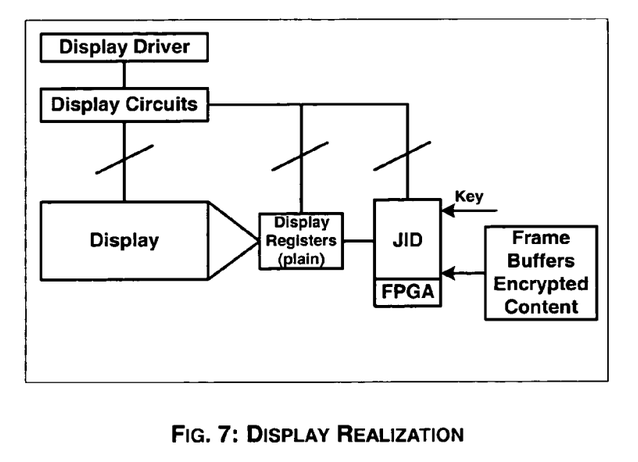
FIG. 7 describes a realization of displaying functionality.
Figure 7A:
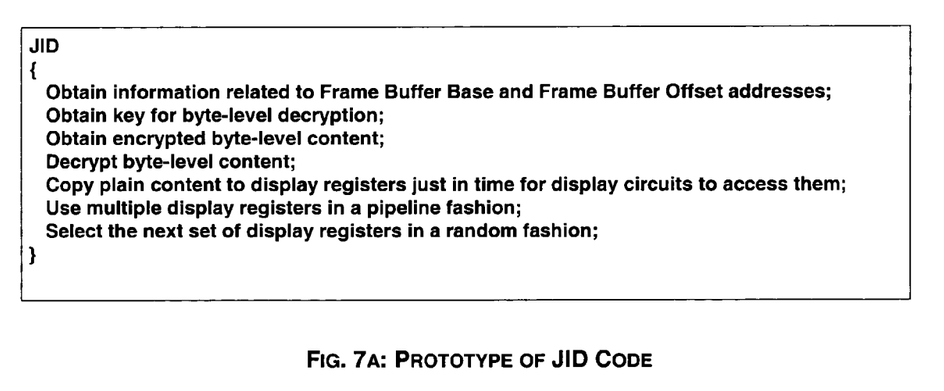
FIG. 7A describes a prototype code for incremental decryption.

FIG. 7 depicts an FPGA-based PCR system integrated very finely with display circuitry to collectively realize displaying of protected content. FIG. 7A depicts the pseudo-code to achieve Just in time Decryption (JID). Note that JID used in order to avoid accessibility to plain content. In this approach, byte-by-byte decryption is performed so that plain contents in display registers are not available for too long for any manipulation.

Figure 8:
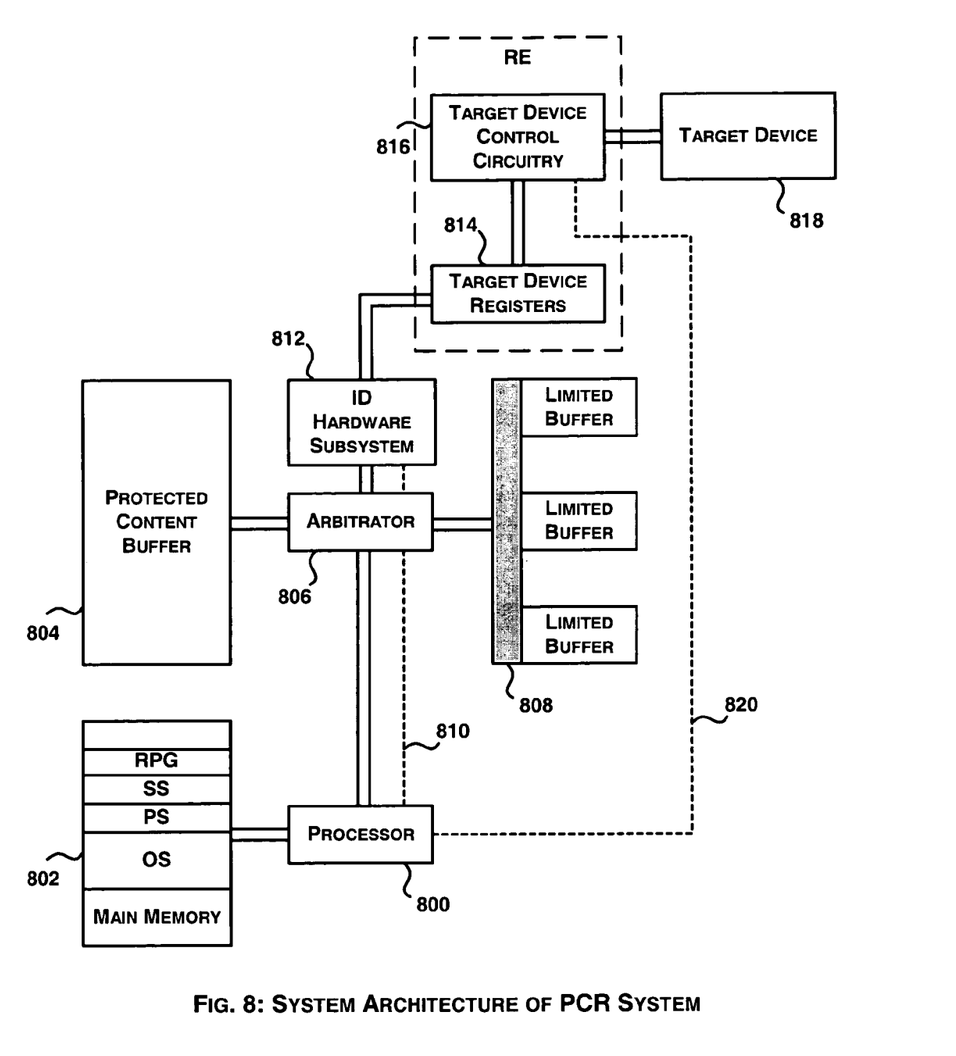
FIG. 8 describes the system architecture of PCR system.

FIG. 8 describes the system architecture of PCR system. PCR system is realized partially in hardware and partially in software. The main processor (800) provides support to realize PS, SS, and RPG subsystems in software (802). In order to have an efficient access to the protected content to be rendered, a separate buffer is provided to contain the same (804). Arbitrator (806) realized in hardware randomly distributes a block to a selected limited buffer (808). The processor sends appropriate control signals (810) to the arbitrator and to the hardware subsystem that implements ID (812). The plain content, output from ID subsystem, is sent to the target device registers (814) and is used by the target device control circuitry (816) to render the contents of the device registers onto the target device (818). Note that RE subsystem is realized mostly in hardware and is tightly integrated with the target device control subsystem. The necessary signals to be sent to RPG, ID, and PS are generated by the processor based on the control signal (820) received from the target device control circuitry.

Thus, a system and method for protected content rendering is disclosed. Although the present invention has been described particularly with reference to the figures, it will be apparent to one of the ordinary skill in the art that the present invention may appear in any number of systems that perform incremental decryption. It is further contemplated that many changes and modifications may be made by one of ordinary skill in the art without departing from the spirit and scope of the present invention.

What is claimed is:

1. A protected content rendering system to render an encrypted content on a device with a device control circuitry and a plurality of display registers using a plurality of limited buffers for reducing the quantum and time of availability of a plain content of said encrypted content, said system comprising:

means for determining a buffer of said plurality of limited buffers in a random manner;

means for generating a random byte pattern based on said buffer, wherein said random byte pattern is a plurality of random numbers without duplicates with each of said plurality of random numbers is a number between zero and a pre-defined number, wherein said pre-defined number is based on the size of said buffer;

means for obtaining an encrypted block based on said encrypted content;

means for decrypting said encrypted block resulting in a decrypt content;

means for filling said buffer based on said decrypt content and said random byte pattern;

means for making said buffer a part of an incremental portion of said plain content;

means for just-in-time decryption of said encrypted content resulting in a just-in-time portion of said plain content;

means for copying said incremental portion to said plurality of display registers;

means for copying said just-in-time portion to said plurality of display registers; and means for enabling said device control circuitry to render on said device based on said plurality of display registers.

2. The system of claim 1, wherein said means for just-in-time decryption further comprise:

means for copying a block from said encrypted content to an encrypted block of a limited buffer of said plurality of limited buffers based on an arbitrator, wherein said arbitrator randomly selects said limited buffer from said plurality of limited buffers and randomly selects said encrypted block from said limited buffer;

means for obtaining a plurality of encrypt bytes from said plurality of limited buffers based on said arbitrator and a plurality of signals from said device control circuitry;

means for decrypting said plurality encrypt bytes based on byte-level decryption resulting in said just-in-time portion of said plain content; and means for providing a control signal to said device control circuitry based on said arbitrator.

* * * * *

UNITED STATES PATENT AND TRADEMARK OFFICE
CERTIFICATE OF CORRECTION

PATENT NO. : 7,640,438 B2  Page 1 of 1
APPLICATION NO. : 11/058622
DATED : December 29, 2009
INVENTOR(S) : Varadarajan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this

Ninth Day of November, 2010

David J. Kappos
*Director of the United States Patent and Trademark Office*